US012276154B2

(12) United States Patent
Soderqvist

(10) Patent No.: US 12,276,154 B2
(45) Date of Patent: Apr. 15, 2025

(54) DOUBLE DOOR SYSTEM AND METHOD WITH SERVICE CHECK MODE

(71) Applicant: Assa Abloy Entrance Systems AB, Landskrona (SE)

(72) Inventor: Sven-Gunnar Soderqvist, Vallakra (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 526 days.

(21) Appl. No.: 17/619,504

(22) PCT Filed: Jun. 17, 2020

(86) PCT No.: PCT/EP2020/066689

§ 371 (c)(1),
(2) Date: Dec. 15, 2021

(87) PCT Pub. No.: WO2020/260082

PCT Pub. Date: Dec. 30, 2020

(65) Prior Publication Data

US 2022/0178190 A1 Jun. 9, 2022

(30) Foreign Application Priority Data

Jun. 24, 2019 (SE) .................................... 1930219-9

(51) Int. Cl.
*E05F 5/12* (2006.01)
*E05F 1/10* (2006.01)
*E05F 15/63* (2015.01)

(52) U.S. Cl.
CPC .................. *E05F 5/12* (2013.01); *E05F 1/10* (2013.01); *E05F 15/63* (2015.01);
(Continued)

(58) Field of Classification Search
None
See application file for complete search history.

(56) References Cited

U.S. PATENT DOCUMENTS

2001/0015032 A1 8/2001 Juntunen
2008/0309275 A1 12/2008 Nguyen et al.
(Continued)

FOREIGN PATENT DOCUMENTS

CN 104541010 4/2015
CN 105220977 1/2016
(Continued)

OTHER PUBLICATIONS

English translation of Homberg et al. German Patent Document 102009004506, published 2010.*
(Continued)

*Primary Examiner* — Bernard G Lindsay
(74) *Attorney, Agent, or Firm* — Wissing Miller LLP

(57) ABSTRACT

Double door system (1) comprising an understriking door leaf (2), an overstriking door leaf (3), a first door operator (11) adapted to move the understriking door leaf (2) between an open and a closed position, a second door operator (12) adapted to move the overstriking door leaf (3) between an open and a closed position, a mechanical brake arrangement (100) and an electric coordination system (90).

8 Claims, 8 Drawing Sheets

(52) U.S. Cl.
CPC ..... *E05Y 2201/21* (2013.01); *E05Y 2201/232* (2013.01); *E05Y 2201/246* (2013.01); *E05Y 2201/408* (2013.01); *E05Y 2201/434* (2013.01); *E05Y 2201/624* (2013.01); *E05Y 2400/20* (2013.01); *E05Y 2400/302* (2013.01); *E05Y 2400/415* (2013.01); *E05Y 2400/44* (2013.01); *E05Y 2400/458* (2013.01); *E05Y 2900/132* (2013.01)

(56) References Cited

U.S. PATENT DOCUMENTS

| | | | | |
|---|---|---|---|---|
| 2011/0257796 | A1* | 10/2011 | Burris | E05F 15/70 700/282 |
| 2012/0144744 | A1* | 6/2012 | No | E05F 15/41 49/31 |
| 2014/0150581 | A1* | 6/2014 | Scheuring | B60J 5/047 74/89.38 |
| 2017/0183898 | A1* | 6/2017 | Söderqvist | E05F 15/611 |
| 2017/0183899 | A1 | 6/2017 | Soderqvist | |

FOREIGN PATENT DOCUMENTS

| | | |
|---|---|---|
| CN | 106133263 | 11/2016 |
| CN | 106164402 | 11/2016 |
| DE | 10023760 | 12/2000 |
| DE | 10107456 | 9/2002 |
| DE | 20121728 | 4/2003 |
| DE | 102009004506 | 7/2010 |
| DE | 102012103210 | 10/2013 |
| DE | 102014212570 | 12/2015 |
| GB | 2067656 | 7/1981 |
| WO | 2015150174 | 10/2015 |

OTHER PUBLICATIONS

Chinese Office Action in 2020800459374, dated Feb. 16, 2023.
International Search Report in PCT/EP2019/066689 mailed Aug. 28, 2020.
Swedish Search Report in 1930219-9 mailed Feb. 2, 2020.

* cited by examiner

DOUBLE DOOR SYSTEM AND METHOD WITH SERVICE CHECK MODE

This application is a 371 of PCT/EP2020/066689, filed on Jun. 17, 2020, published on Dec. 30, 2020 under publication number WO 2020/260082, which claims priority benefits from Swedish Patent Application No. 1930219-9, filed on Jun. 24, 2019, the disclosure of which is incorporated herein by reference.

TECHNICAL FIELD

The present invention relates to a double door system comprising an understriking door leaf and an overstriking door leaf. The present invention further relates to method for operating the double door system.

BACKGROUND

Fire door installations are commonly used in public areas to enable containment of fire and smoke as well as safe escape routes in case of emergencies. Conventional fire door installations often implement swing door leafs. To provide a large door opening double swing door leafs may be utilized.

Fire double swing door installations in the prior art are often rebated. In such an installation one of the swing door leafs overlaps slightly. Accordingly one of the swing doors is provided with a flange which extends over the outer phase of the other swing door leaf so as to cover the gap between them when the swing door leafs are in a closed position.

Due to the importance of proper function of the fire door, there are legal requirements which stipulates that the door leafs must be closed in correct order to ensure a fully closed door set in case of a fire. Thus, one of the door leaf functions as a master door leaf and the other a slave door leaf.

In the past, the order which the door is closed has been tested manually. This is performed by service personnel switching off the power to the door operator and subsequently opens the door. Afterwards, the service personnel lets the master door leaf close and observes if it is stopped to allow for the slave door leaf to close before said master door leaf. Upon the closing of the slave door leaf it is observed if it sends a mechanical signal in response to which the master door leaf completes the closing sequence of the door set.

The inventor has realized that there is room for improvement in this field.

SUMMARY

According to one aspect, a double door system is provided. The double door system comprises an understriking door leaf, an overstriking door leaf, a first door operator adapted to move the understriking door leaf between an open and a closed position, a second door operator adapted to move the overstriking door leaf between an open and a closed position, a mechanical brake arrangement and an electric coordination system.

The understriking door leaf should be closed before the overstriking door leaf to close the double door. The mechanical brake arrangement comprises a braking member arranged to brake the movement of the overstriking door leaf and a first controlling member which is mechanically operated.

The first controlling member is arranged to control the braking of the braking member in relation to the position of the understriking door leaf.

The second door operator comprises a second motor arranged to drive the overstriking door leaf between the opened and closed position.

The electric coordination system further comprises an electric coordination controller operatively connected to the second motor. The electric coordination controller is configured to control the second motor to brake the movement of the overstriking door leaf based on the position of the understriking door leaf. The electric coordination system is electrically operated.

According to an aspect a method of operating a double door system is provided.

Embodiments of the invention are defined by the appended dependent claims and are further explained in the detailed description section as well as in the drawings.

It should be emphasized that the term “comprises/comprising” when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to “a/an/the [element, device, component, means, step, etc]” are to be interpreted openly as referring to at least one instance of the element, device, component, means, step, etc., unless explicitly stated otherwise. The steps of any method disclosed herein do not have to be performed in the exact order disclosed, unless explicitly stated.

A reference to an entity being “designed for” doing something, or “capable of” doing something in this document is intended to mean the same as the entity being “arranged for”, “configured for” or “adapted for” doing this very something, and vice versa.

BRIEF DESCRIPTION OF THE DRAWINGS

The invention will be described in more detail with reference to the accompanying drawings, in which.

DETAILED DESCRIPTION

Figure 1:
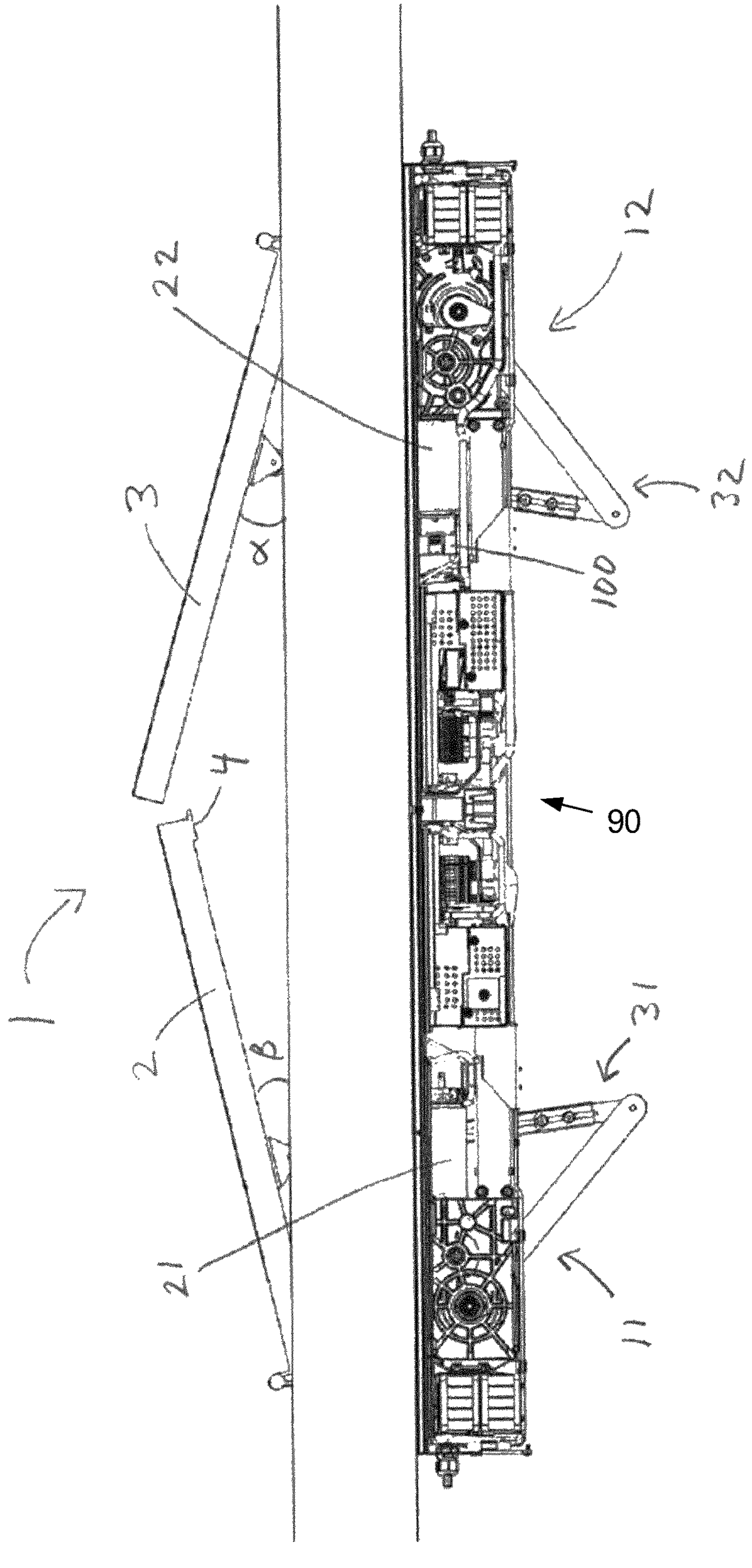
FIG. 1 is a top view of an embodiment of a double door system according to the present invention.

Present invention relates to a double door system which comprises both a mechanical braking arrangement and an electric coordination system cooperating to operate an overstriking door leaf and an understriking door leaf.

As stated above, the present invention relates to a double door system 1 comprising an understriking door leaf 2, an overstriking door leaf 3, a first door operator 11 adapted to move the understriking door leaf 2 between an open and a closed position, a second door operator 12 adapted to move the overstriking door leaf 3 between an open and a closed position and a mechanical brake arrangement 100. The understriking door leaf 2 should be closed before the overstriking door leaf 2 to close the double door.

The mechanical brake functionality will be further described with reference to FIG. 1.

The mechanical brake arrangement 100 comprises a braking member 101, 102 arranged to brake the movement of the overstriking door leaf 3.

The mechanical brake arrangement comprises a first controlling member 103. The first controlling member is mechanically operated. The first controlling member 103 is arranged to control the braking of the braking member 101, 102 in relation to the position of the understriking door leaf 2.

The mechanical brake arrangement may in one embodiment further comprise a second controlling member 104. The second controlling member is mechanically operated. The second controlling member 104 is arranged to control the braking of the braking member 101, 102 in relation to the position of the overstriking door leaf 3.

The second door operator 12 comprises a second motor 22 arranged to drive the overstriking door leaf 3 between the opened and closed position. The second motor 22 may be considered a motor associated with the second door operator 12, i.e. comprised in the second door operator. Said motor 22 is arranged to drive the overstriking door leaf 3 between the opened and closed position.

Hence, the second door operator 12 comprises a motor 22 arranged to drive the overstriking door leaf 3 between the opened and closed position. The electric coordination system 90 further comprises the electric coordination controller 91 operatively connected to the motor 22. The electric coordination controller 91 is configured to control the motor 22 to brake the movement of the overstriking door leaf 3 based on the position of the understriking door leaf 2.

Figure 2:
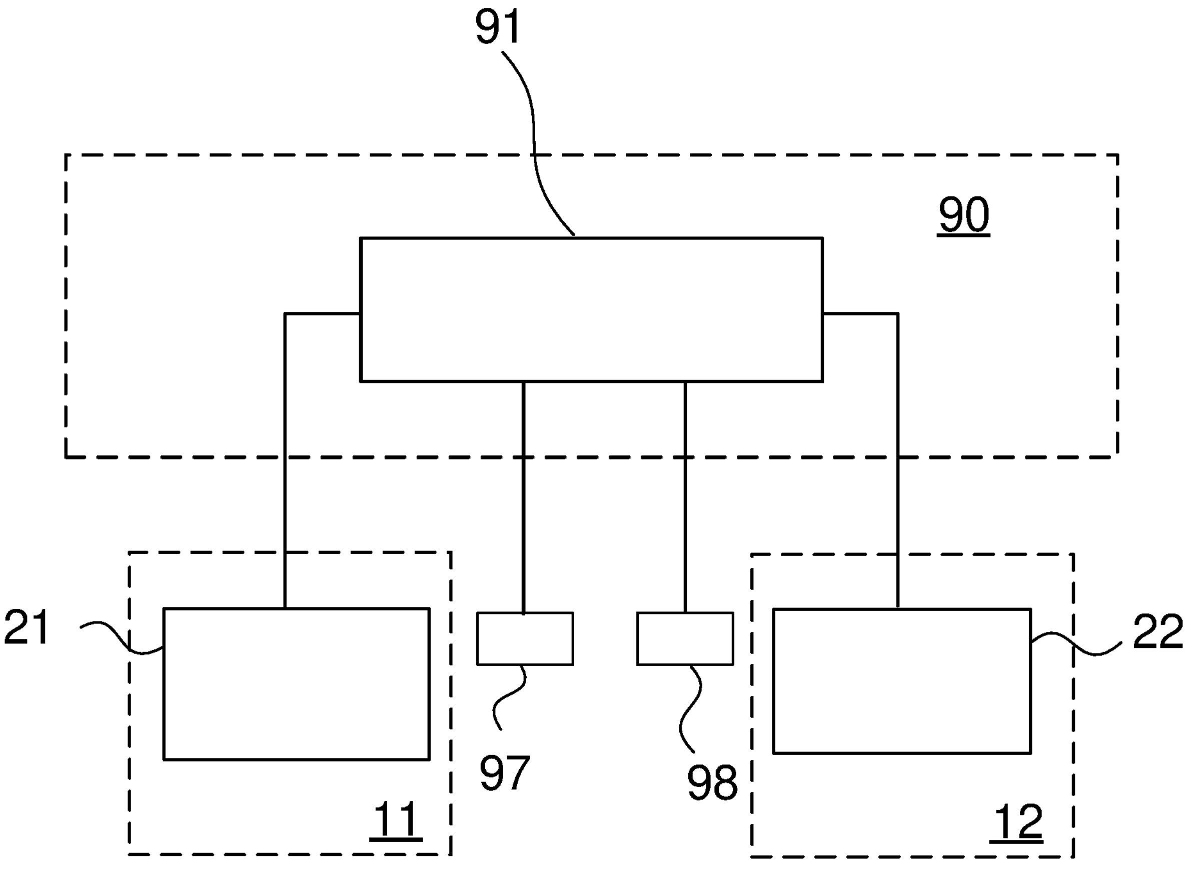
FIG. 2 is a schematic view of an electric coordination system according to an embodiment of the present invention.
Figure 3:
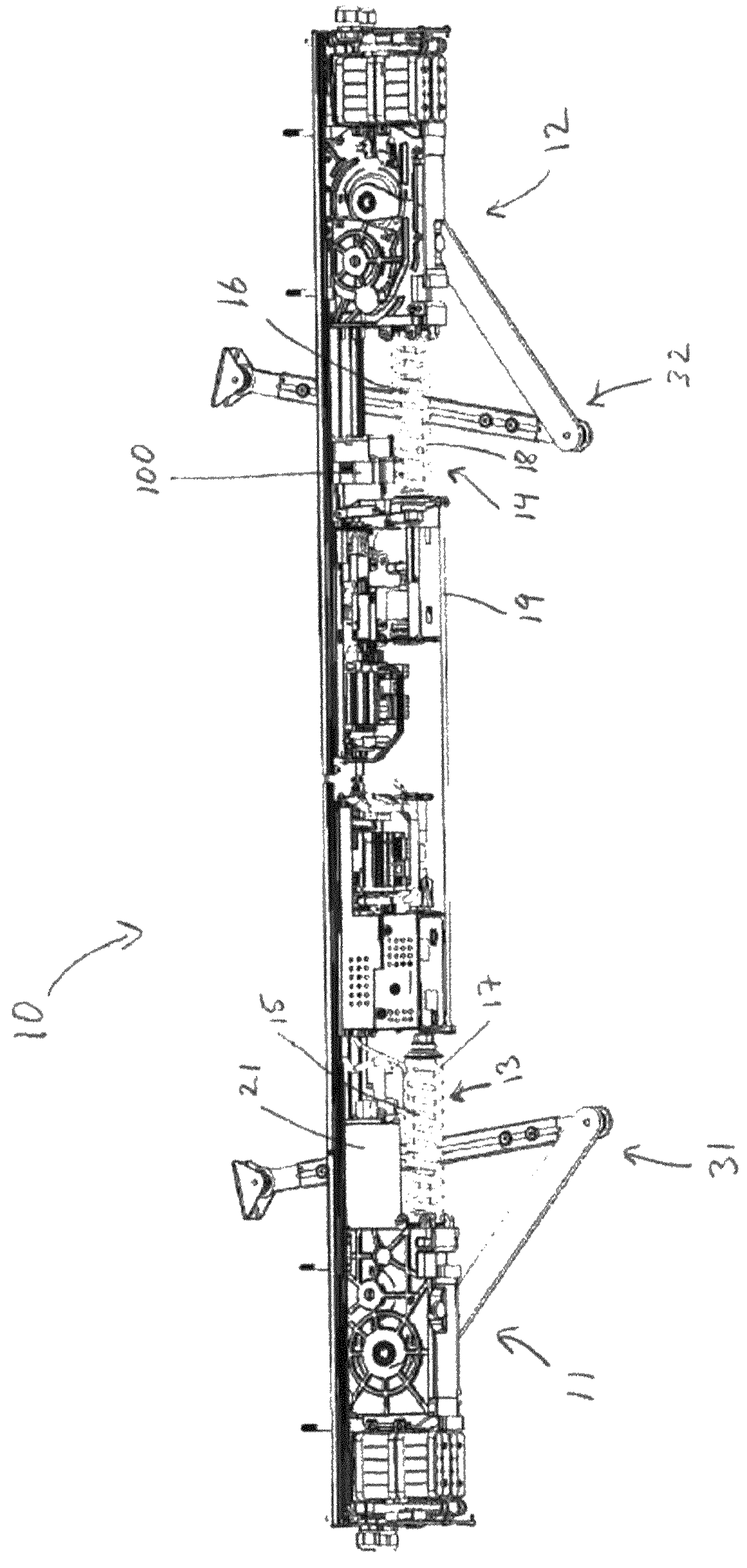
FIG. 3 is a top view of an embodiment of a door operator system according to the present invention.

The double door system further comprises an electric coordination system 90 which is further described in FIG. 2. The electric coordination system 90 may be arranged to control the movement of the overstriking door leaf 3. The electric coordination system 90 further comprises an electric coordination controller 91 operatively connected to the second motor 22. The electric coordination controller 91 is configured to control the second motor 22 to brake the movement of the overstriking door leaf 3 based on the position of the understriking door leaf 2. The electric coordination system 90 is electrically operated.

Thereby, a mechanical and electronic braking system may operate in concert or alternately in order to achieve the closing of the door. This is associated with a number of advantages. For example, it provides a fail-safe braking due to one of the braking systems being able to function as a back-up braking system. Also, switching between the mechanical and electrical braking system reduces the wear of the components of the door operators resulting in longer service life and a more cost efficient double door system.

In one embodiment, the electric coordination controller 91 is operatively connected to a first sensing element 97. The first sensing element 97 being for monitoring an understriking door leaf angle (β) in relation to a closed position of the understriking door leaf 3. The electric coordination controller 91 is configured to control the operation of the second motor 22 to brake the movement of the overstriking door leaf 2 based on the understriking door angle.

The electric coordination controller (91) may be operatively connected to a second sensing element 98 for monitoring an overstriking door angle in relation to a closed position of the overstriking door leaf 3, whereby the electric coordination controller 91 is configured to control the second motor 21 to brake the movement of the overstriking door leaf 2 based on the overstriking door angle.

Further referencing FIG. 1-2, analogously to the second controlling member, the electric coordination system 90 may be further arranged to control the movement of the understriking door leaf 2.

Hence, in one embodiment, the electric coordination controller 91 may be configured to control a first motor of the first door operator.

The first door operator 11 may thus comprise a first motor 21 arranged to drive the understriking door leaf 2 between the opened and closed position. The electric coordination controller 91 is operatively connected to the first motor 21 to control the operation of said first motor 21. The first motor 21 may be considered a motor associated with the first door operator 11, i.e. a motor comprised in the first door operator. Said motor 11 is arranged to drive the understriking door leaf 2 between the opened and closed position The electric coordination controller 91 may in one embodiment be configured to control the first motor 21 to brake the movement of the understriking door leaf 2 based on the position of the overstriking door leaf 3.

The electric coordination controller 91 may further be operatively connected to the second sensing element 98. The second sensing element 98 is for monitoring an overstriking door angle in relation to a closed position of the overstriking door leaf 3. The electric coordination controller 91 may be configured to control the first motor 21 to brake the movement of the understriking door leaf 2 based on the overstriking door angle.

In order to close the double doors properly, the understriking door leaf should be closed or almost closed before the overstriking door leaf is moved into its closed position. This may be performed by means of the mechanical brake arrangement and/or the electric coordination system.

If the braking is performed by means of the mechanical brake arrangement, the first controlling member controls the braking action of the braking member and thereby also the movement of the overstriking door leaf based on the position of the understriking door leaf. The second controlling member controls the braking member and thereby also the movement of the overstriking door leaf based on the position of the overstriking door leaf. The movement of the overstriking door leaf can thereby be based on both the position of the understriking door leaf and the position of the overstriking door leaf.

If the braking is performed by means the electric coordination system, the second motor is controlled by means of the electric coordination controller and thereby also the movement of the overstriking door leaf based on the position of the understriking door leaf. The understriking door leaf may be manually operated by a user or by means of a motor driving the first door operator.

In both the case of the manual braking and the electrical braking by means of the electric coordination system, the overstriking door leaf does not have to stand still and wait until the understriking door leaf is in its closed position, but instead the overstriking door leaf can start its movement earlier and thereby a rapid closing of the double doors are achieved. A rapid closing of the double door results in improved confinement of heat or cold in a space to which the double doors lead. Rapid closing also makes unauthorized access more difficult. Further, rapid closing improves the fire safety by restricting spreading of smoke and limit the supply of oxygen to a fire.

Since the first controlling member and/or the electric coordination controller controls the braking action of the braking member and thereby also the movement of the overstriking door leaf based on the position of the understriking door leaf, the braking member and/or the second door operator can keep the overstriking door leaf opened until the understriking door leaf is closed or almost closed. Since the second controlling member and/or the electric coordination controller controls the braking member and thereby also the movement of the overstriking door leaf based on the position of the overstriking door leaf, the overstriking door leaf can be allowed to move in the closing direction as long as the overstriking door leaf does not obstruct the closing of the understriking door leaf. The mechanical brake arrangement and/or electric coordination system is arranged to coordinate the closing of the door leafs such that the understriking door leaf is closed before the overstriking door leaf is closed.

Again referencing FIG. 1, one of the door leafs may have a shoulder 4 that overlaps the other door leaf. In one embodiment, the understriking door 2 leaf is provided with a shoulder 4 that overlaps the overstriking door leaf 3. The shoulder is then provided on the side of the understriking door leaf facing the closing direction of the understriking door leaf. In an alternative embodiment, the overstriking door leaf is provided with a shoulder that overlaps the understriking door leaf (not shown). The shoulder is then provided on the side of the overstriking door leaf facing the opening direction of the overstriking door leaf. A double door comprising a shoulder is sometimes called a rebated door. A double door comprising two door leafs is sometimes called a dual door.

The mechanical brake arrangement is mechanically operated. No electrical supply is needed for the proper operation of the mechanical brake arrangement. Therefore, the mechanical brake arrangement is operable without power. Thus, the mechanical brake arrangement is operable in a powerless condition. The braking member 101, 102 is arranged to mechanically brake the movement of the overstriking door leaf 3. The first controlling member 103 and the second controlling member 104 are mechanically operated.

The first controlling member 103 is arranged to mechanically control the braking of the braking member 101, 102 in relation to the position of the understriking door leaf 2, and the second controlling member 104 is arranged to mechanically control the braking of the braking member 101, 102 in relation to the position of the overstriking door leaf 3.

The braking member 101, 102 is arranged to brake the movement of the overstriking door leaf 3 in a powerless condition. The first controlling member 103 is arranged to control the braking of the braking member 101, 102 in relation to the position of the understriking door leaf 2 in a powerless condition, and the second controlling member 104 is arranged to mechanically control the braking of the braking member 101, 102 in relation to the position of the overstriking door leaf 3 in a powerless condition.

In one embodiment, the first controlling member 103 is arranged to put the braking member 101, 102 in a non-braking state when the understriking door leaf 2 is in a closed condition, and the second controlling member 104 is arranged to put the braking member 101, 102 in a non-braking state when the overstriking door leaf 3 is in a first opened state, which first opened state corresponds to a position of the overstriking door leaf 3 having an angle (α) in relation to a closed position of the overstriking door leaf 3 that is larger than a first predetermined angle αm. By putting the braking member in a non-braking state when the understriking door leaf is in a closed condition, the overstriking door leaf is allowed to move in the closing direction, and into its closed position, when the understriking door leaf is in closed condition. By putting the braking member in a non-braking state when the overstriking door leaf is in the first opened state, the overstriking door leaf is also allowed to move in the closing direction when the overstriking door leaf is opened to a certain extent. The overstriking door leaf is thereby allowed to move when the overstriking door leaf is in a position between its fully opened position and a position where the overstriking door leaf has a first predetermined angel αm in relation to its fully closed position.

The closed condition of the understriking door leaf as used herein is meant to include a fully closed position and positions close to a fully closed position of the understriking door leaf, such as positions where a second angle (β) between the understriking door leaf and the fully closed position of the understriking door leaf is between about 0° and about 2°.

In one embodiment, the first controlling member 103, 203, 303, 403 and the second controlling member 104 are arranged to put the braking member 101, 102 in a braking state when the understriking door leaf 2 is in an opened condition and the overstriking door leaf 3 is in a second opened state, which second opened state corresponds to a position of the overstriking door leaf 3 having an angle (α) in relation to a closed position of the overstriking door leaf 3 that is equal to or smaller than said predetermined angel αm. By putting the braking member in a braking state when the understriking door leaf is in an opened condition and the overstriking door leaf is in the second opened state, the movement of the overstriking door leaf in the closing direction is braked when the overstriking door leaf is in a region around its closed position and when the understriking door leaf at the same time is in an opened condition, i.e. in a position outside the closed condition of the understriking door leaf. Thereby, the closing of the understriking door leaf may be unobstructed by the overstriking door leaf.

The opened condition of the understriking door leaf as used herein is meant to include a fully opened position and opened positions except those positions included in the closed condition of the understriking door leaf, such as positions where the angle (β) between the understriking door leaf and the fully closed position of the understriking door leaf is more than about 2°.

In one embodiment, the first predetermined angel αm is set such that the understriking door leaf 2 could be moved into its closed position without interfering with the overstriking door leaf 3 when the angle (α) of the overstriking door leaf 3 is equal to or larger than the first predetermined angel αm. Thereby, the understriking door leaf can be moved from an opened position to its closed position without interfering with the overstriking door leaf. The overstriking door leaf is allowed to move in the closing direction when the angle of the overstriking door leaf is larger than the first predetermined angel αm, i.e. when the overstriking door leaf does not interfere with the understriking door leaf. The movement of the overstriking door leaf in the closing direction is allowed when the overstriking door leaf not risk interfering with the understriking door leaf during closing of the understriking door leaf. The movement of the overstriking door leaf in the closing direction is braked when the angle of the overstriking door leaf is equal to or smaller than the first predetermined angel αm, i.e. when the overstriking door leaf interferes with the understriking door leaf. The movement of the overstriking door leaf in the closing direction is braked when the overstriking door leaf risk interfering with the understriking door leaf during closing of the understriking door leaf. The first predetermined angel αm is preferably set such that a margin is included in relation to the angle α where the understriking door leaf only barely could be moved into its closed position without interfering with the overstriking door leaf. In one embodiment, the first predetermined angel αm is in the range 8° to 60°, such as 10° to 45°, such as 10° to 30°, such as 15° to 20°.

In one embodiment, the first controlling member 103 is movable between a braking position and a non-braking position and the second controlling member 104 is movable between a braking position and a non-braking position, wherein the braking member 101, 102 is in the non-braking state when any one or both of the first controlling member 103 and the second controlling member 104 is in their respective non-braking position, and wherein the braking member 101, 102 is in the braking state when both of the first controlling member 103 and the second controlling member 104 are in their respective braking positions. Since the braking member is in the non-braking state when the first controlling member is in its non-braking position or when the second controlling member is in its non-braking position or when both the first controlling member is in its non-braking position and the second controlling member is in its non-braking position, the overstriking door leaf is allowed to move in the closing direction when any one or both of the first and second controlling member are in their respective non-braking positions. Since the braking member is in the braking state when both the first controlling member is in its braking position and the second controlling member is in its braking position, the movement of the overstriking door leaf in the closing direction is braked when both of the first and second controlling member are in their respective braking positions. The state of the braking member and thus also the braking action of the braking member is dependent on the position of both of the first and second controlling member. Any one of the first and second controlling member can put the braking member in the non-braking state, but in order to have the braking member in the braking state both the first and the second controlling member have to be in their braking positions. In one embodiment, the first controlling member is in the non-braking position when the understriking door leaf is in the closed condition as defined above. In one embodiment, the first controlling member is in the braking position when the understriking door leaf is in the opened condition as defined above. In one embodiment, the second controlling member is in the non-braking position when the overstriking door leaf is in the first opened state as defined above. In one embodiment, the second controlling member is in the braking position when the overstriking door leaf is in the second opened state as defined above.

The first and second opened state as discussed associated with the mechanical brake arrangement may be considered a first and second mechanical opened state.

Referencing FIG. 2, the electric coordination system may be arranged to put the second door operator 12 in an electrical braking state when the understriking door leaf 2 is in an opened condition and the overstriking door leaf 3 is in a second opened state. The second opened state corresponds to a position of the overstriking door leaf having an angle (α) in relation to a closed position of the overstriking door leaf 3 that is equal or smaller than a second predetermined angle αe. Accordingly, the electric coordination controller 91 is configured to instruct the second motor 22 of the second door operator 12 to provide a braking torque in response to the overstriking door leaf having said angle. Thus, the second door operator is put in the electrical braking state for braking the movement of the overstriking door leaf 3.

Thus, the electric coordination system, i.e. the electric coordination controller 91, is arranged to put the second door operator 12 in a non-braking state when the understriking door leaf 2 is in a closed condition. Further, the electric coordination system is arranged to put the second door operator 12 in a non-braking state when the overstriking door leaf 3 is in a first opened state, which first opened state corresponds to a position of the overstriking door leaf 3 having an angle (α) in relation to a closed position of the overstriking door leaf 3 that is larger than a predetermined angle αe. Accordingly, the electric coordination controller 91 is configured to instruct the second motor 21 to not provide any braking torque. Thus, the second door operator is put in the electrical non-braking state for allowing movement of the overstriking door leaf 3.

The first and second opened state as discussed associated with the electrical coordination system may be considered a first and second electrical opened state.

In one embodiment, the second predetermined angle αe is larger than the first predetermined angel αm. Hence, the overstriking door leaf 3 is braked by means of the electric coordination system before the mechanical brake arrangement is arranged to put the braking member in a mechanical braking state. This allows for the double door system to primarily be braked by means of the electric coordination system and only utilize the mechanical braking arrangement as a secondary braking mean which is activated in a powerless state or if the electric coordination system malfunctions. This is particularly advantageous due to the mechanical braking arrangement being more susceptible to wear compared to the electric coordination system.

Similar to the mechanical braking arrangement, by putting the second door operator 12 in a non-braking state when the understriking door leaf is in a closed condition, the overstriking door leaf is allowed to move in the closing direction, and into its closed position, when the understriking door leaf is in closed condition. By putting the second door operator 12 in a non-braking state when the overstriking door leaf is in the first opened state, the overstriking door leaf is also allowed to move in the closing direction when the overstriking door leaf is opened to a certain extent. The overstriking door leaf is thereby allowed to move when the overstriking door leaf is in a position between its fully opened position and a position where the overstriking door leaf has a second predetermined angle αe in relation to its fully closed position.

The closed condition of the understriking door leaf as used herein is meant to include a fully closed position and positions close to a fully closed position of the understriking door leaf, such as positions where a second angle (β) between the understriking door leaf and the fully closed position of the understriking door leaf is between about 0° and about 2°.

In one embodiment, the electric coordination system 90 is arranged to put the second door operator 12 in a braking state when the understriking door leaf 2 is in an opened condition and the overstriking door leaf 3 is in a second opened state, which second opened state corresponds to a position of the overstriking door leaf 3 having an angle (α) in relation to a closed position of the overstriking door leaf 3 that is equal to or smaller than said second predetermined angle $\alpha e$. By putting the second door operator 12 in a braking state when the understriking door leaf is in an opened condition and the overstriking door leaf is in the second opened state, the movement of the overstriking door leaf in the closing direction is braked when the overstriking door leaf is in a region around its closed position and when the understriking door leaf at the same time is in an opened condition, i.e. in a position outside the closed condition of the understriking door leaf. Thereby, the closing of the understriking door leaf may be unobstructed by the overstriking door leaf.

The opened condition of the understriking door leaf as used herein is meant to include a fully opened position and opened positions except those positions included in the closed condition of the understriking door leaf, such as positions where the angle ($\beta$) between the understriking door leaf and the fully closed position of the understriking door leaf is more than about 2°.

In one embodiment, the first predetermined angel $\alpha m$ is set such that the understriking door leaf 2 could be moved into its closed position without interfering with the overstriking door leaf 3 when the angle ($\alpha$) of the overstriking door leaf 3 is equal to or larger than the second predetermined angle $\alpha e$. Thereby, the understriking door leaf can be moved from an opened position to its closed position without interfering with the overstriking door leaf. The overstriking door leaf is allowed to move in the closing direction when the angle of the overstriking door leaf is larger than the second predetermined angle $\alpha e$, i.e. when the overstriking door leaf does not interfere with the understriking door leaf. The movement of the overstriking door leaf in the closing direction is allowed when the overstriking door leaf not risk interfering with the understriking door leaf during closing of the understriking door leaf. The movement of the overstriking door leaf in the closing direction is braked when the angle of the overstriking door leaf is equal to or smaller than the second predetermined angle $\alpha e$, i.e. when the overstriking door leaf interferes with the understriking door leaf. The movement of the overstriking door leaf in the closing direction is braked when the overstriking door leaf risk interfering with the understriking door leaf during closing of the understriking door leaf. The second predetermined angle $\alpha e$ is preferably set such that a margin is included in relation to the angle $\alpha$ where the understriking door leaf only barely could be moved into its closed position without interfering with the overstriking door leaf. In one embodiment, the second predetermined angle $\alpha e$ is in the range 8° to 60°, such as 10° to 45°, such as 10° to 30°, such as 15° to 20°.

Further referencing FIG. 2, the electric coordination system 90 may be configured for performing different functions of the first and second door operator. One or more of these functions may relates to opening of the understriking door leaf and the overstriking door leaf. Accordingly, the electric coordination system 91 may have control outputs connected to the first motor 11 and the second motor 12 for controlling the actuation of said first and second motor.

The electric coordination controller 91 may be implemented in any known controller technology, including but not limited to microcontroller, processor (e.g. PLC, CPU, DSP), FPGA, ASIC or any other suitable digital and/or analog circuitry capable of performing the intended functionality.

The electric coordination controller 91 has an associated memory. The memory may be implemented in any known memory technology, including but not limited to E(E)PROM, S(D)RAM or flash memory. In some embodiments, the memory may be integrated with or internal to the electric coordination controller 91. The memory may store program instructions for execution by the electric coordination controller 31, as well as temporary and permanent data used by the electric coordination controller 91.

In one embodiment, the second predetermined angle $\alpha e$ may be stored in said associated memory.

In one embodiment, the first sensing element 97 and/or second sensing element 98 may be an encoder or revolution counter associated with the first motor 22 and the second motor 22, respectively.

In one embodiment, the first sensing element 97 and/or second sensing element 98 is a door leaf angle sensor. The door leaf angle sensor may at least comprise one of an accelerometer and a gyroscope. In one embodiment, a first door leaf angle sensor may be mounted to the understriking door leaf or a first moving part of the mechanical brake arrangement. In one embodiment, a second door leaf angle sensor may be mounted to the overstriking door leaf.

In one embodiment, the first sensing element 97 is connected to an input of the electric coordination controller 91. The electric coordination controller 91 may be configured to use one or more readings of the first sensing element 97, typically a number of pulses generated as a motor shaft of the first motor rotates, for determining a current angular position, e.g. the understriking door leaf angle ($\beta$), of the understriking door leaf 2.

In one embodiment, the second sensing element 98 is connected to an input of the electric coordination controller 91. The electric coordination controller 91 may be configured to use one or more readings of the second sensing element 98, typically a number of pulses generated as a motor shaft of the second motor rotates, for determining a current angular position, e.g. the overstriking door leaf angle ($\alpha$), of the overstriking door leaf 2.

The electric coordination controller 91 may be configured to instruct the second motor 22 to provide a braking torque for braking the movement of the overstriking door 3 leaf in relation to the position of the understriking door leaf 2. The braking torque required for braking the movement of the overstriking door leaf 3 may be based on the inertia of the overstriking door leaf 3 (which is a constant value), the internal friction of the second door operator 12 (e.g. motor and gearbox) and the friction provided by a second moving part 32 which transfers the torque from the second motor 22 to the overstriking door leaf which will be described in more detail later on.

Similarly, in an embodiment wherein the first motor 11 of the first door operator is arranged to be braked by means of electric coordination controller 91, the electric coordination controller 91 may be configured to instruct the first motor 22 to provide a braking torque for braking the movement of the understriking door 2 leaf. This may be in relation to the position of the overstriking door leaf 3. The braking torque required for braking the movement of the understriking door leaf 2 may be based on the inertia of the understriking door leaf 2 (which is a constant value), the internal friction of the door operator 11 (.e.g. motor and gearbox) and the friction provided by a first moving part 31 which transfers the torque from the first motor 21 to the overstriking door leaf which will be described in more detail later on.

In one embodiment, the electric coordination system 90 is operable in a learn mode and in an operational mode.

In the learn mode 60, the electric coordination controller 91 of the electric coordination system 90 is configured to establish information required as control input data for subsequent use by the electric coordination controller 91 during normal operation, in other words the torque required for the first and/or second motor to brake the associated door leafs. The established information may include the inertia 62 of the understriking door leaf and/or the overstriking door leaf (being a constant value), the internal friction of the first and/or second door operator (being linearly dependent on the door leaf angle), and—when the first and/or second moving part 31, 32 is in the form of a forced close arrangement—the spring force 64 thereof (being linearly dependent on the door leaf angle). If the first and/or second moving part 31, 32 is in the form of a link arm the friction of the link arm may be comprised in the established information.

In addition to the above, in the learn mode the electric coordination controller 91 of the electric coordination system 90 is configured to automatically establish a reduction curve by determining, for a movement of the overstriking and/or understriking door leaf between the closed position and the open position, the torque required by the first and/or second motor to cause movement of the overstriking and/or understriking door leaf at different door leaf angles (α,β). The different door leaf angles are determined from measurement readings of the first sensing element 97 and/or the second sensing element 98.

In one embodiment, the torque may be determined by counting the number of pulses reported from the first and or second sensing element during movement of the overstriking door leaf and/or understriking door leaf by a certain angular amount, i.e. an increase in the overstriking door leaf angle and/or the overstriking door leaf angle by a certain angular amount m. The certain angular amount m may, for instance, be 1°, or more or less than 1° depending on the desired angular resolution of the reduction curve 65 to be established.

In one embodiment, the first motor 21 may be an electric servomotor. In one embodiment, the second motor 22 may be an electric servomotor.

The first and second door operators may be arranged to push the door leafs in the opening direction (shown in FIGS. 1-6) or to pull the door leafs in the opening direction.

Referencing FIGS. 1 and 2-8, in one embodiment the second door operator 12 comprises a second moving part 14, which moves in relation to the position of the overstriking door leaf 3, and the second controlling member 104 is coupled to the second moving part 14 such that the second moving part 14 moves the second controlling member 104 between a braking position and a non-braking position. Thereby, the control of the movement of the overstriking door leaf is based on the movement of the second moving part. The movement of the second moving part is in its turn dependent on the position of the overstriking door leaf.

Figure 4:
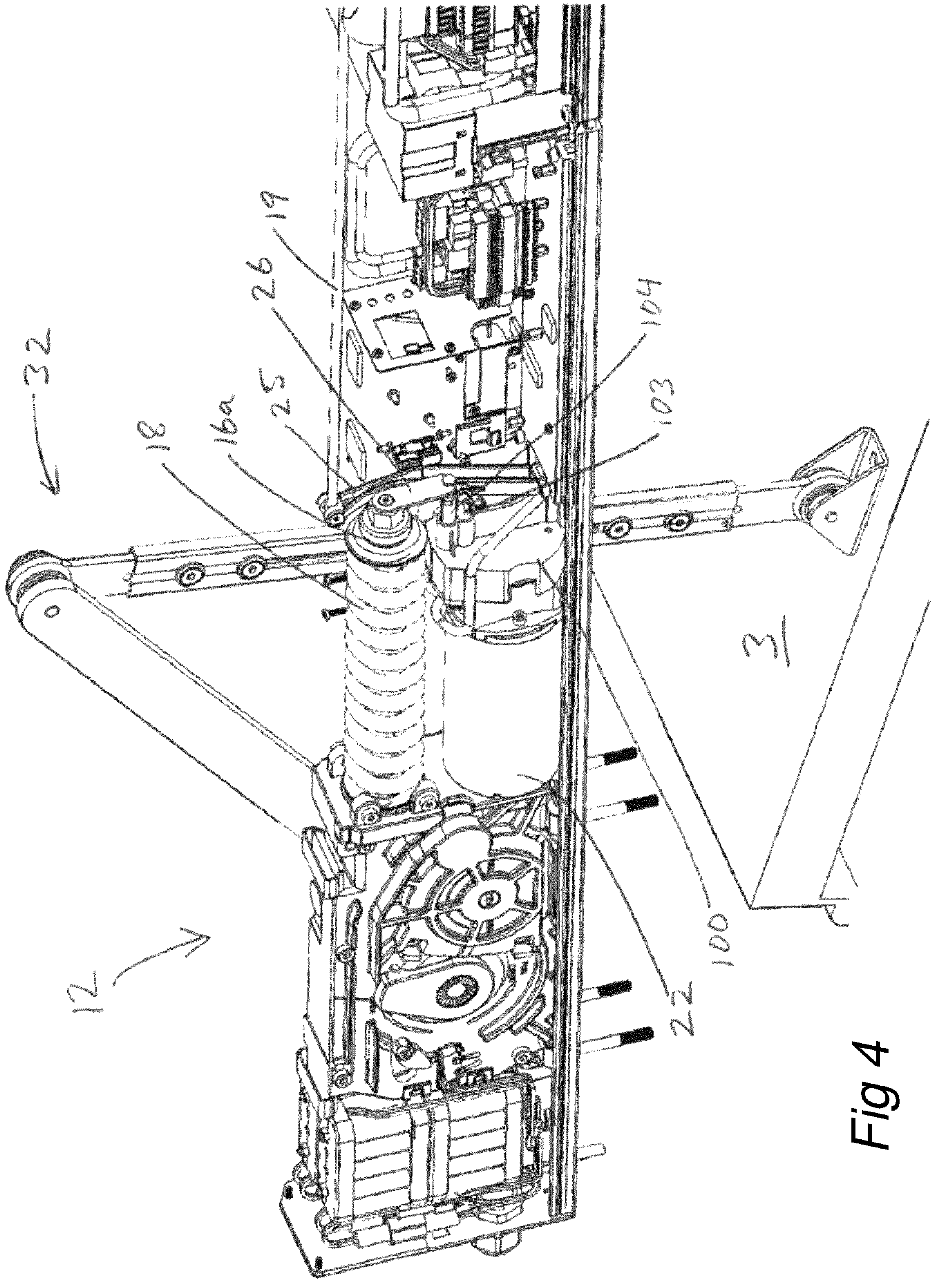
FIG. 4 is a perspective view of an embodiment of a second door operator according to the present invention.
Figure 5:
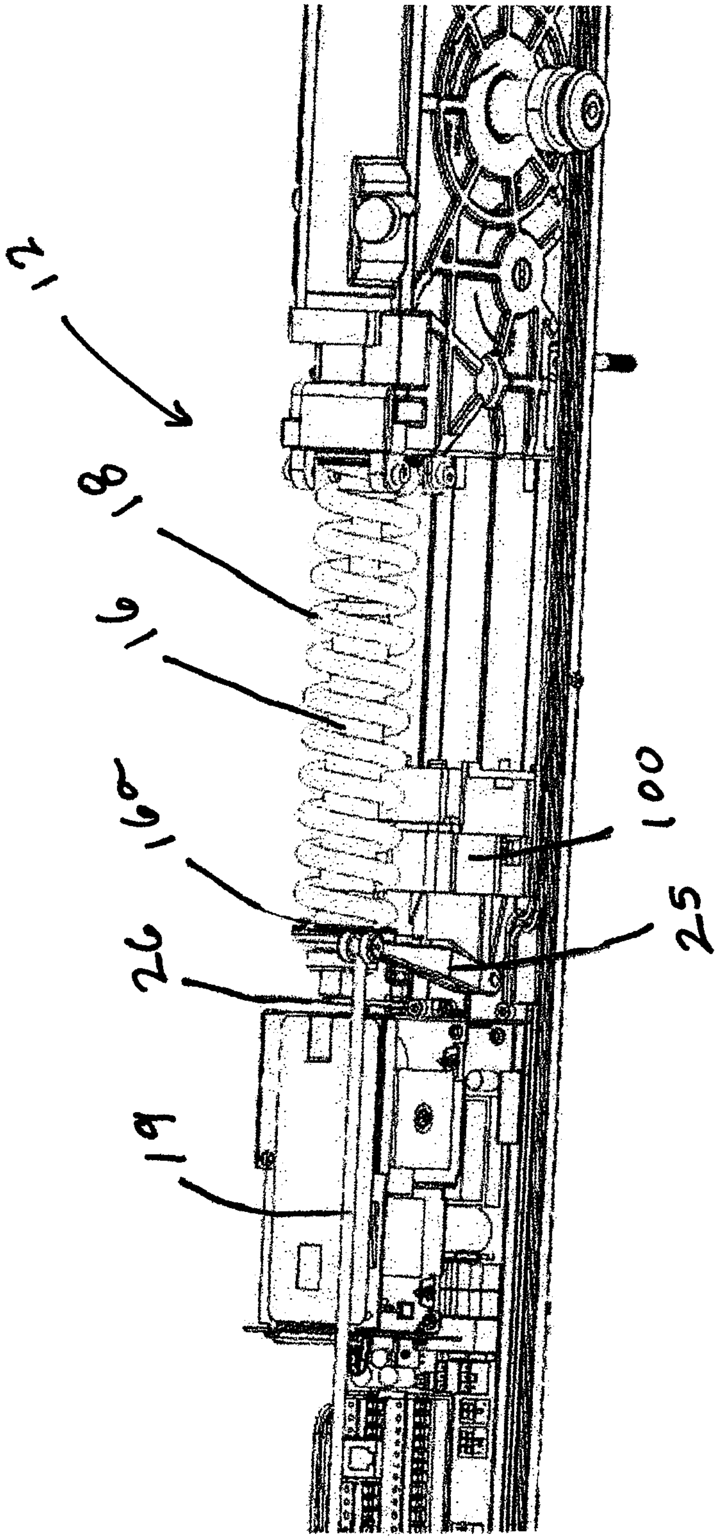
FIG. 5 is a perspective view of a detail of the embodiment of a second door operator shown FIG. 3.
Figure 6:
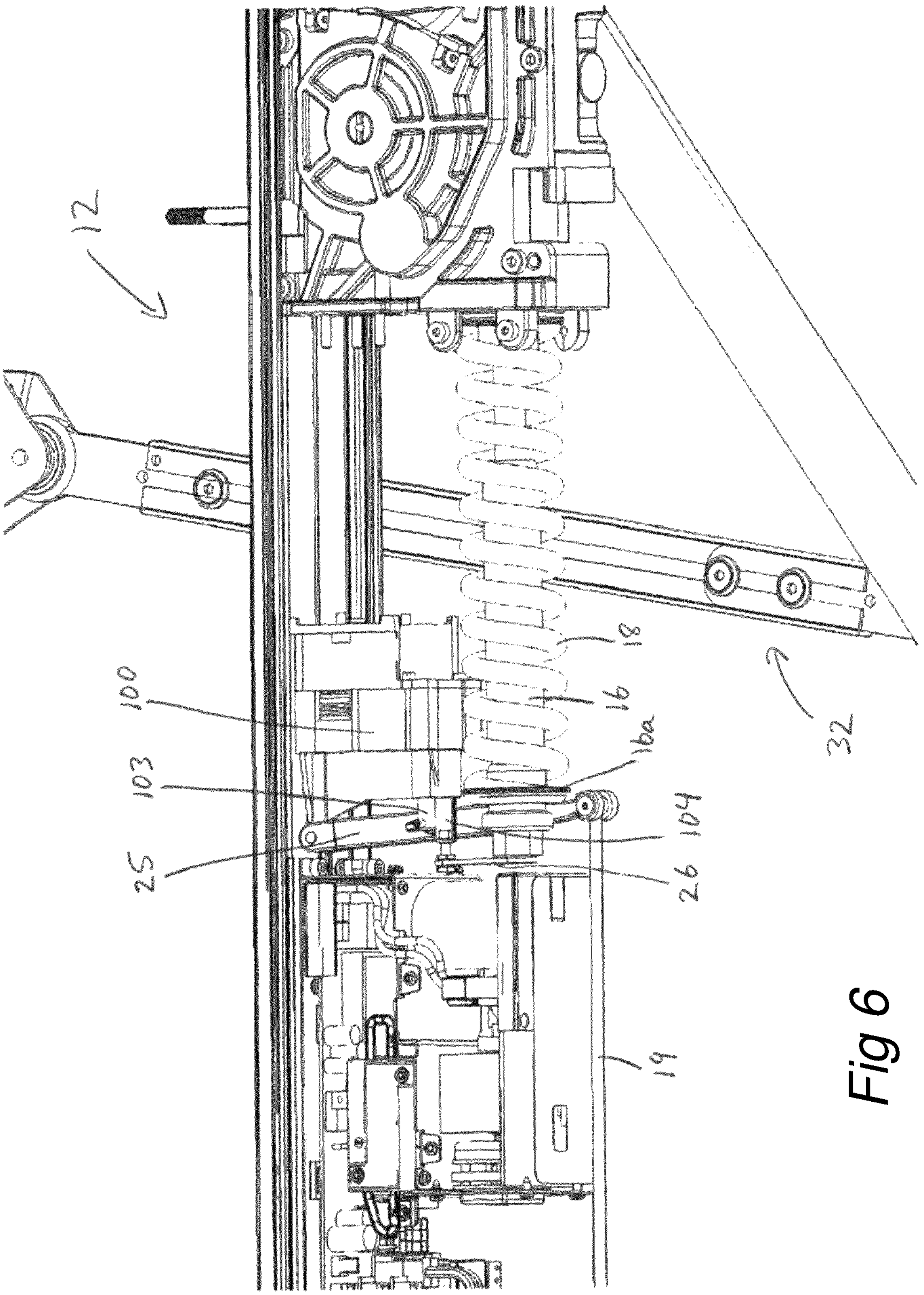
FIG. 6 is a perspective view of another detail of the embodiment of a second door operator shown FIG. 3.

In one embodiment, the second moving part 14 is a second spring arrangement 14. The second moving part may also be a second door operator arm (similar to 32 in FIG. 1) or any other part of the second door operator that moves in relation to the position of the overstriking door leaf. In one embodiment, the second moving part is a second spring rod 16 of a second spring arrangement 14 as shown in FIGS. 2, 4 and 5. In one embodiment, the second spring rod 16 compresses a second spring 18 when the overstriking door leaf 3 is opened. The spring load stored in the compressed second spring 18 may move the overstriking door leaf 3 in the closing direction.

In one embodiment, the first door operator 11 comprises a first moving part 13, which moves in relation to the position of the understriking door leaf 2, and the first controlling member 103 is coupled to the first moving part 13 such that the first moving part 13 moves the first controlling member 103 between a braking position and a non-braking position. Thereby, the control of the movement of the understriking door leaf is based on the movement of the first moving part. The movement of the first moving part is in its turn dependent on the position of the understriking door leaf.

Figure 7:
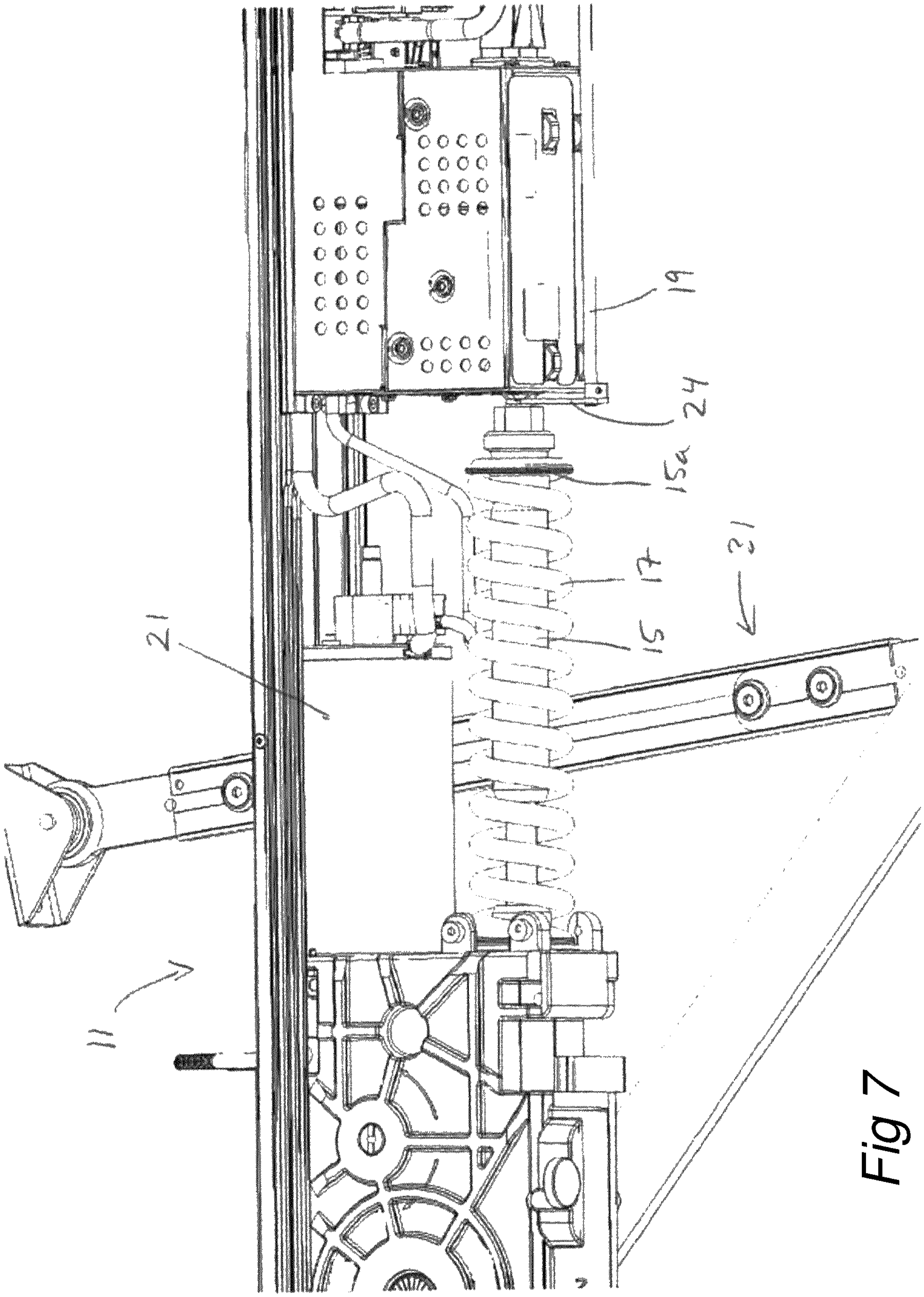
FIG. 7 is a perspective view of an embodiment of a first door operator according to the present invention.

In one embodiment, the first moving part 13 is a first spring arrangement 13. The first moving part may also be a first door operator arm (similar to 31 in FIG. 1) or any other part of the first door operator that moves in relation to the position of the understriking door leaf. In one embodiment, the first moving part 13 is a first spring rod 15 of a first spring arrangement 13 as shown in FIG. 7. In one embodiment, the first spring rod 15 compresses a first spring 17 when the understriking door leaf 2 is opened. The spring load stored in the compressed first spring 17 may move the understriking door leaf 2 in the closing direction.

In one embodiment, the first controlling member 103, 203, 303, 403 is coupled to the first moving part 13 by means of a first position transferring rod 19.

In the embodiment shown in FIG. 7, the first spring rod 15 is connected to the first position transferring rod 19 by means of a first connector 24.

In the embodiment shown in FIGS. 4-6 and 8, the first position transferring rod 19 is connected to the first controlling member 103 by means of a first arm 25 and the second spring rod 16 is connected to the second controlling member 104 by means of a second connector 26.

In one embodiment, the braking member 101, 102 has a passive position and an active position, wherein the braking member 101, 102 is in its braking state in the passive position and the braking member 101, 102 is in its non-braking state in the active position. Thereby, the braking member applies a braking action in its passive position. The passive position corresponds to the resting state of the braking member. The braking member may be in its passive position when the braking member is unaffected by brake controlling member, such as the first controlling member and the second controlling member. The braking member may be in its active position when the braking member is affected by brake controlling member, such as any or both of the first and second controlling member. In one embodiment, the braking member may automatically be brought to its passive position when the braking member becomes unaffected by brake controlling member. In one embodiment, the braking member may automatically return from its active position to its passive position when the braking member has been affected by brake controlling member and becomes unaffected by brake controlling member.

In one embodiment, the passive position of the braking member 101, 102 is obtained by a brake spring 105. The brake spring may force the braking member into the braking state of the braking member when the braking member is unaffected. The brake spring may also bring the braking member into the braking state when the braking member becomes unaffected by brake controlling member.

In one embodiment, the braking member 101, 102 is unaffected by the first controlling member 103 and the second controlling member 104 in the passive position. In one embodiment, the braking member 101, 102 is affected by the first controlling member 103 and/or the second controlling member 104 in the active position.

In one embodiment, the first controlling member 103 and the second controlling member 104 are arranged to mechanically move the braking member 101, 102 from its passive position to its active position. Thereby, the first controlling member and the second controlling member mechanically control the position of the braking mans. The first and second controlling member are thereby arranged to put the braking member in the non-braking state. The first and second controlling member are arranged to move the braking member from the braking state to the non-braking state.

In one embodiment, the first controlling member 103 is arranged to move the braking member 101, 102 to the active position when the understriking door leaf 2 comes into the closed condition as defined above. In one embodiment, the second controlling member 104 is arranged to move the braking member 101, 102 to the active position when the overstriking door leaf 3 comes into the first opened state as defined above. In one embodiment, the first controlling member 103 is arranged to move the braking member 101, 102 from the passive position to the active position when the understriking door leaf 2 is moved to the closed condition as defined above. In one embodiment, the second controlling member 104 is arranged to move the braking member 101, 102 from the passive position to the active position when the overstriking door leaf 3 is moved to the first opened state.

In one embodiment, the first controlling member 103 and the second controlling member 104 are further arranged to mechanically move the braking member 101, 102 from its active position to its passive position. Thereby, the first controlling member and the second controlling member mechanically control the position of the braking member further. The first and second controlling member are thereby arranged to put the braking member in the braking state. The first and second controlling member are arranged to move the braking member from the non-braking state to the braking state.

In one embodiment, the second controlling member 104 is arranged to move the braking member 101, 102 to the passive position when the understriking door leaf 2 is in the opened condition as defined above and the overstriking door leaf 3 comes into the second opened state as defined above, when the overstriking door leaf 3 is in the second opened state and the understriking door leaf 2 comes into the opened condition or when the understriking door leaf 2 comes into the opened condition and the overstriking door leaf 3 comes into the second opened state essentially simultaneously. In one embodiment, the second controlling member 104 is arranged to move the braking member 101, 102 from the active position to the passive position when the understriking door leaf 2 is in the opened condition as defined above and the overstriking door leaf 3 is moved to the second opened state as defined above, when the overstriking door leaf 3 is in the second opened state and the understriking door leaf 2 is moved to the opened condition or when the understriking door leaf 2 is moved to the opened condition and the overstriking door leaf 3 is moved to the second opened state essentially simultaneously.

In one embodiment, the mechanical brake arrangement 100 is arranged to brake a rotation of a second motor shaft of the second motor 22 of the second door operator 12. In one embodiment, the second door operator 12 comprises a second motor 22 having a motor shaft. The second motor 22 of the second door operator 12 may be arranged to open the overstriking door leaf 3. Thereby, the mechanical brake arrangement 100 may be arranged to brake a rotation of a motor shaft of a motor 22 of the second door operator 12, which motor 22 is arranged to open the overstriking door leaf 3. The brake drum 107 may be connected to the motor shaft of the second motor 22. The second motor may be an electric motor.

In one embodiment, the first door operator 11 comprises the first motor 21. The first motor 21 of the first door operator 11 may be arranged to open the understriking door leaf 2. The first motor may be an electric motor.

In one embodiment, the mechanical brake arrangement 100 is arranged to only affect the movement of the overstriking door leaf 3 in a closing direction of the overstriking door leaf 3.

In one embodiment, the mechanical brake arrangement comprises a brake drum 107. The braking action of the mechanical brake arrangement is achieved by action of the braking member 101, 102 on the brake drum. Thereby, the braking member act 101, 102 on the brake drum 107. The braking member 101, 102 abuts the brake drum 107 in the braking state. The braking member 101, 102 is separated from the brake drum 107 in the non-braking state. In one embodiment, the brake drum 107 is mounted on a second motor shaft of a second motor 22. In one embodiment, the one way-clutch 105 is arranged between the brake drum 107, 207, 407 and the second motor shaft of the second motor 22.

In one embodiment, the mechanical brake arrangement 100 comprises a brake spring 105, which forces the braking member 101, 102 towards the brake drum 107.

In one embodiment, the first controlling member 103 is arranged to separate the braking member 101, 102 from the brake drum 107. The first controlling member 103 is arranged to separate the braking member 101, 102 from the brake drum 107 in the non-braking position of the first controlling member 103. In one embodiment, the first controlling member 103 is arranged to not affect the braking member 101, 102 in the braking position of the first controlling member 103.

In one embodiment, the second controlling member 104 is arranged to separate the braking member 101, 102 from the brake drum 107. The second controlling member 104 is arranged to separate the braking member 101, 102 from the brake drum 107 in the non-braking position of the second controlling member 104. In one embodiment, the second controlling member 104 is arranged to not affect the braking member 101, 102 in the braking position of the second controlling member 104.

In the non-braking state of the braking member 101, 102 either the first controlling member 103 or the second controlling member 104 separates the braking member 101, 102 from the drum 107.

In one embodiment, the mechanical brake arrangement comprises two braking member 101, 102. In one embodiment, the first controlling member 103 is arranged to control the braking of both of said two braking member 101, 102. In one embodiment, the second controlling member 104 is arranged to control the braking of both of said two braking member 101, 102.

Figure 8:
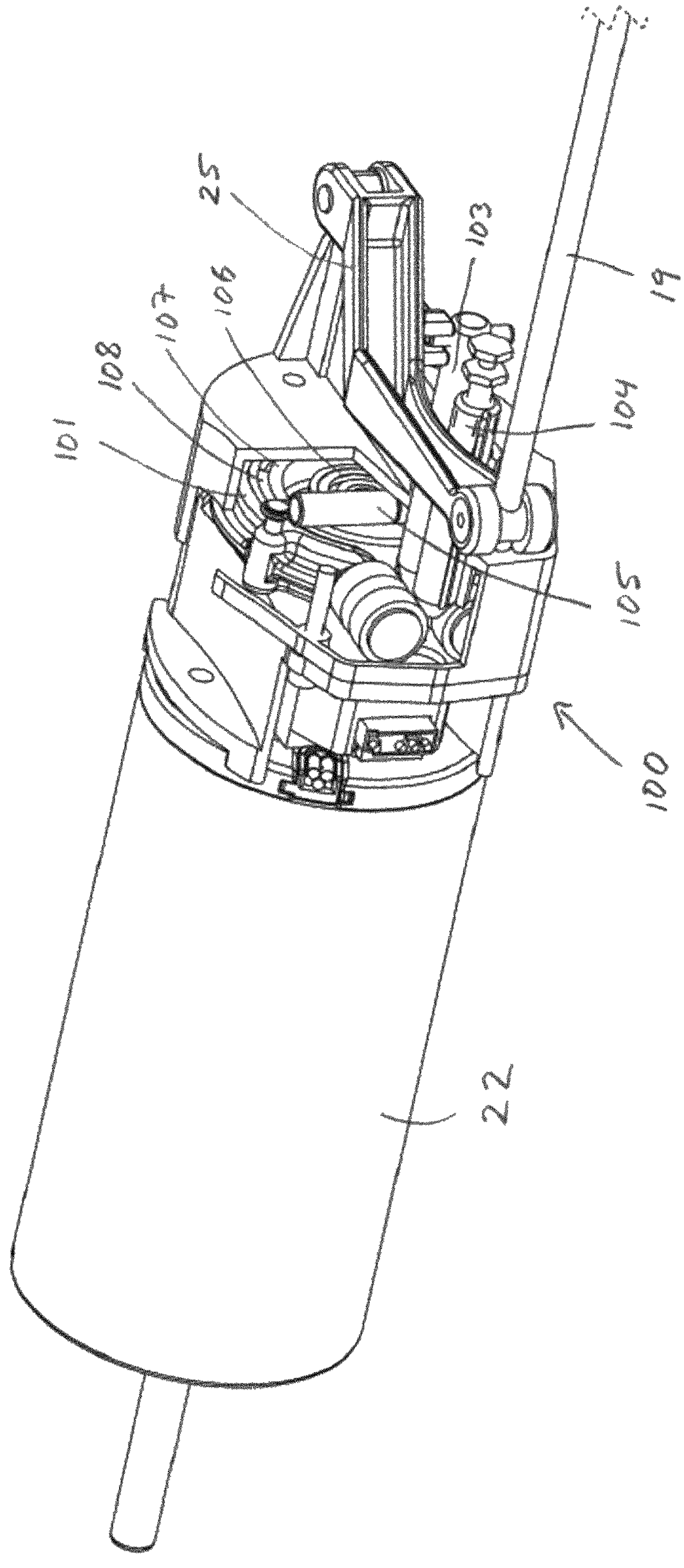
FIG. 8 is perspective view of an embodiment of a mechanical brake arrangement according to the present invention.

In the embodiment shown in FIG. 8, the first controlling member 103 is arranged between the free ends of the two braking member 102 (the other not shown) in the non-braking position of the first controlling member 103. Thereby, the first controlling member 103 separates the two braking member 102 (the other not shown) from the drum 107. The second controlling member 104 is arranged between the free ends of the two braking member 102 (the other not shown) in the non-braking position of the second controlling member 104. Thereby, the second controlling member 104 separates the two braking member 102 (the other not shown) from the drum 107. The braking member 101, 202 act on the outside of the drum 107. The brake spring 105 is a tension spring pushing the two braking member 101, 102 radially inwards.

The operation of the invention is explained below.

The operation of the double door is explained as follows.

When both the understriking door leaf 2 and the overstriking door leaf 3 are fully opened, the understriking door leaf 2 is in its opened condition and the overstriking door leaf 3 is in its first opened state, i.e. the angle α is larger than the predetermined value set for the mechanical braking arrangement or the electric coordination system.

Then the first controlling member 103 is in its braking position and the second controlling member 104 is in its non-braking position. The braking member 101 is then in its non-braking state (since at least one of the controlling member is in its non-braking position and the braking member thereby is separated from the drum). Thus, the overstriking door leaf 3 is allowed to move in the closing direction. There is no risk that the overstriking door leaf will block the closing of the understriking door leaf as long as the overstriking door leaf in its first opened state.

In case the overstriking door leaf 3 is moved into its second opened state, i.e. the overstriking door leaf 3 is moved to a position where the angle α is equal to the predetermined angle set for the mechanical braking arrangement or electric coordination system, when the understriking door leaf 2 still is in its opened condition, then, if the mechanical braking arrangement is activated, the first controlling member 103 is still in its braking position and the second controlling member 104 is moved into its braking position. The braking member 101, 102 is then in its braking state (since both of the controlling member is in their braking position and the braking member thereby abuts the drum). If the electric coordination system is activated, the electric coordination controller 91 instructs the second motor 22 to brake the movement overstriking door leaf 3 when the overstriking door leaf 3 in the second opened state as set by the second predetermined angle αe. Hence, the electric coordination controller may be configured to cause the second motor to operate in reverse, e.g. from a driving direction for driving the door in the closing direction to a braking direction for braking the door.

Thus, the movement of the overstriking door leaf 3 is braked in the closing direction. The overstriking door leaf 3 will be held at an angle α equal to the predetermined angle until the understriking door leaf 2 has reached its closed condition in order to avoid that the overstriking door leaf 3 blocks the closing movement of the understriking door leaf 2.

When the understriking door leaf 2 is moved into its closed condition, the first controlling member 103 is moved into its non-braking position. The overstriking door leaf 3 is still in its second opened state, i.e. the overstriking door leaf 3 is in a position where the angle α is equal to the predetermined angle as set by the mechanical braking arrangement or the electric coordination system.

If the overstriking door leaf 3 is braked by means of the mechanical braking arrangement, then the first controlling member 103 is in its non-braking position and the second controlling member 104 is still in its braking position. The braking member 101 is then in its non-braking state (since at least one of the controlling member is in its non-braking position and the braking member thereby is separated from the drum). Thus, the overstriking door leaf 3 is allowed to move in the closing direction. Thereby, the double door is closed properly.

If the overstriking door leaf 3 is braked by means of the electric coordination system, the electric coordination system 90 will put the second door operator in a non-braking state in response to the understriking door leaf reaching its closed position. Thus, the electric coordination controller 91 will instruct the second motor 22 to not provide any braking torque and allow for the movement of the overstriking door leaf. Further, the electric coordination controller 91 may instruct the second motor 22 to drive the overstriking door leaf 3 towards its closed position. Subsequently, the mechanical braking arrangement will not be activated and the door will close.

In case the understriking door leaf 2 instead reaches its closed condition when the overstriking door leaf still is in its first opened state, i.e. the angle α is larger than the predetermined value as set by the mechanical braking arrangement or the electric coordination system, then, if the mechanical braking arrangement is activated, the first controlling member 103 is moved into its non-braking position and the second controlling member 104 is still in its in its non-braking position. The braking member 101, 102 is then in its non-braking state (since at least one, at this point both, of the controlling member is in its non-braking position and the braking member thereby is separated from the drum). Thus, the overstriking door leaf 3 is allowed to move in the closing direction.

If electric coordination system is activated, the electric coordination controller 91 instructs the second door operator 12 to be in a non-braking state, thereby allowing the overstriking door leaf 3 to move in the closing direction. Hence, the electric coordination controller 91 instructs the second motor 22 to not provide any braking torque. The electric coordination controller may be configured to cause the second motor 22 to drive the overstriking door leaf 3 in the closing direction if the understriking door leaf 2 is in the closed condition and the overstriking door angle is larger than the second predetermined angle αe.

When the overstriking door leaf 3 is moved into its second opened state, i.e. the overstriking door leaf 3 is moved to a position where the angle α is equal to or smaller than the predetermined angle set by the mechanical braking arrangement or the electric coordination system, if the mechanical braking arrangement is activated, the second controlling member 104 is moved into its braking position. The understriking door leaf 2 still is in its closed condition and then the first controlling member 103 is still in its non-braking position. The braking member 101, 102 is then in its non-braking state (since at least one of the controlling member is in its non-braking position and the braking member thereby is separated from the drum). Thus, the overstriking door leaf 3 is allowed to move in the closing direction. Thereby, the double door is closed properly.

The movement of the first controlling member based on the position of the understriking door leaf is explained as follows.

When the understriking door leaf 2 is opened, i.e. moved to its opened condition, e.g. by means of the first motor 21 and the first door operator arm 31 or by hand, the first spring rod 15 is moved in the opposite direction of the second door operator 12. By movement of the first spring rod 15, a first end 15*a* of the first spring rod 15 compresses the first spring 17. By movement of the first spring rod 15, the first position transferring rod 19 connected to the first spring rod 15 is moved in same direction as the first spring rod 15. Thereby the first controlling member 103, which is connected to the first position transferring rod 19, is moved in the same direction as the first position transferring rod 19 and into its braking position, where the first controlling member 103 does not affect the braking member 101, 102.

When the understriking door leaf 2 is closed, i.e. moved to its closed condition, e.g. by means of a spring load stored in the first spring 17 during compression of the first spring 17, the first spring rod 15 is moved in the direction of the second door operator 12. Thereby, the first position transferring rod 19 connected to the first spring rod 15 is moved in the same direction. Thereby the first controlling member, which is connected to the first position transferring rod 19, is moved in the same direction and into its non-braking position, where the first controlling member 103 separates the braking member 101, 102 from the brake drum 107.

The movement of the second controlling member based on the position of the overstriking door leaf is explained as follows.

When the overstriking door leaf 3 is moved into its first opened state, i.e. into a position where the angle α is larger than the predetermined angle, e.g. by means of the second motor 22 and the second door operator arm 32 or by hand, the second spring rod 16 is moved in the opposite direction of the first door operator 11. By movement of the second spring rod 16, a first end **16*a* of the second spring rod 16 compresses the second spring 18. By movement of the second spring rod 16, the second controlling member, which is connected to the second spring rod 16, is moved in the same direction as the second spring rod 16 and into its non-braking position, where the second controlling member 104 separates the braking member 101, 102 from the brake drum 107**.

When the overstriking door leaf 3 is moved into its second opened state, i.e. into a position where the angle α is equal to or smaller than the predetermined angle, e.g. by means of a spring load stored in the second spring 18 during compression of the second spring 18, the second spring rod 16 is moved in the direction of the first door operator 11. Thereby the second controlling member, which is connected to the second spring rod 16, is moved in the same direction as the second spring rod 16 and into its braking position, where the second controlling member 104 does not affect the braking member 101, 102.

In one embodiment, the electric coordination system 90 is configured to operate in a service check mode. In the service check mode, braking of the understriking door leaf and overstriking door leaf may be solely provided by means of the mechanical braking arrangement.

In the service check mode, the electric coordination controller 91 is configured to instruct the first motor 21 and the second motor 22 to drive the understriking door leaf 2 to its opened condition, e.g. to a position wherein it is in its opened condition, and the overstriking door leaf 3 to its first opened state. The first opened state of the overstriking door leaf 3 corresponds to a position wherein the overstriking door leaf 3 has angle (α) that is larger than the first predetermined angel αm. The electric coordination controller 91 is in response to the understriking door leaf 2 and the overstriking door leaf 3 being the opened condition and the first opened state, respectively, configured to drive the second door operator 12 to move the overstriking door leaf in a closing direction. The opened condition and first opened state is identified by means of sensor data from the first sensing element 97 and the second sensing element 98. Upon reaching the first predetermined angel αm the mechanical brake arrangement is configured to brake the overstriking door leaf, if it is functional.

This allows service personnel to check whether the mechanical brake arrangement is functioning by observing whether the mechanical brake arrangement brakes the overstriking door leaf at the first predetermined angel αm. Commonly, this has to be performed by cutting the power to the door operators and manually operating the door. In the service check mode this can be performed without manual intervention, resulting in a more user-friendly and cost-efficient testing of the function of the mechanical braking arrangement.

The electric coordination system 90 may thus be configured to generate a service alarm signal in response to the first controlling member 103 and the second controlling member 104 not putting the braking member 101, 102 in the mechanical braking state when the understriking door leaf 2 is in an opened condition and the overstriking door leaf 3 is in a second opened state, which second opened state corresponds to a position of the overstriking door leaf 3 having an angle (α) in relation to a closed position of the overstriking door leaf 3 that is equal to or smaller than the first predetermined angel αm.

The electric coordination controller 91 may be configured to subsequently to instructing the second door operator 12 to move the overstriking leaf 3 in a closing direction, in response to sensor data from the second sensing element 98 indicating that the overstriking door leaf is stationary, obtain the angle (α) of the overstriking door leaf 3 and compare said angle (α) with the first predetermined angel αm and if the first angle (α) of the overstriking door leaf 3 is outside a predetermined threshold around said first predetermined angel αm, generate a service alarm. This allows service personnel to remotely get input regarding if the mechanical braking arrangement malfunctions or is not calibrated correctly. For example, the electrical coordination system may receive an instruction remotely to switch to its service check mode. If the mechanical brake arrangement does not engage the overstriking door leaf in the correct position (the first predetermined angel αm), the alarm will be generated. The service alarm may be identified remotely as well.

The above described service alarm may be considered a first service alarm.

The electric coordination controller 91 may be configured to subsequently to instructing the second door operator 12 to move the overstriking door leaf in a closing direction, in response to sensor data from the second sensing element 98 indicating that the overstriking door leaf 3 is stationary, instruct the first motor 21 to drive the first door operator 11 to move the understriking door leaf 2 in a closing direction.

Hence, when the overstriking door leaf is stopped either by means of the mechanical braking arrangement or the overstriking door leaf reaching its closed position if the mechanical brake arrangement malfunctions, the understriking door leaf 2 is instructed to move towards its closed position.

The electrical coordination controller 91 may subsequently to instructing the first motor 21 to drive the first door operator 11 to move the understriking door leaf 2 in the closing direction, be configured to in response to sensor data from the first sensing element 97 and the second sensing element 98 indicating that the overstriking door leaf 3 and the understriking door leaf 2 are stationary, obtain the angle (α) of the overstriking door leaf 3 and the angle (β) of the understriking door leaf 2. If said angle (α) is outside a closed position interval associated with the closed position of said overstriking door leaf and/or said angle (β) is outside of a closed position interval associated with the closed position of said understriking door leaf 2, the electric coordination controller 91 is configured to generate a service alarm.

Thus, the service personnel may be able to remotely and automatically detect whether the mechanical braking arrangement allows for the understriking door leaf to move passed the overstriking door leaf and the subsequent closing of the overstriking door leaf to complete the closing cycle.

The above described service alarm may be considered a second service alarm. In one embodiment, the first service alarm may be distinguishable from the second service alarm, whereby it is possible for the service personnel to identify which components of the mechanical braking arrangement which requires service or replacement.

The electric coordination controller 91 may comprise a timer, whereby above described sensor data indicating a stationary door leaf may be identified by means of the electronic coordination controller 91 not receiving sensor data indicating a change of position of the door leaf during a predetermined time period.

In one embodiment, the electric coordination system 90 is configured to switch to the service check mode in response to receiving a service check command. Said electric coordination system 90 may thus be operatively connected to a user interface configured to generate said command and sending said command to a receiving interface of the electric coordination system. Said receiving interface being operatively connected to the electric coordination controller 91. The user interface may be in the form of a switch located adjacent to the double door system or on one of the door operators. The user interface may be in the form of a central control system of the building wherein the double door system is installed.

In one embodiment, the electric coordination system when operating in the inactive mode is configured to monitor the angle (α) in relation to the closed position of the overstriking door leaf 3 and an angle (β) of the understriking door leaf 2. This may be performed by means of the electric coordination controller 91.

The electric coordination system 90 may be configured to generate a service alarm signal in response to the first controlling member 103 and the second controlling member 104 not putting the braking member 101, 102 in the mechanical braking state when the understriking door leaf 2 is in an opened condition and the overstriking door leaf 3 is in a second opened state, which second opened state corresponds to a position of the overstriking door leaf 3 having an angle (α) in relation to a closed position of the overstriking door leaf 3 that is equal to or smaller than the first predetermined angel αm.

According to an aspect, a method of operating the double door system as described above is provided. The method is described below.

The method comprises controlling the second motor 22 to brake the movement of the overstriking door leaf 3 based on the position of the understriking door leaf 2.

The method may further comprise the first controlling member 103 and the second controlling member 104 putting the braking member 101, 102 in a mechanical braking state when the understriking door leaf 2 is in an opened condition and the overstriking door leaf 3 is in a second opened state, which second opened state corresponds to a position of the overstriking door leaf 3 having an angle (α) in relation to a closed position of the overstriking door leaf 3 that is equal to or smaller than a first predetermined angle (αm).

The method may further comprise the electric coordination system 90 putting the second door operator 12 in an electrical braking state when the understriking door leaf 2 is in an opened condition and the overstriking door leaf 3 is in a second opened state, the second opened state corresponding to a position of the overstriking door leaf 3 having an angle (α) in relation to a closed position of the overstriking door leaf 3 that is equal to or smaller than a second predetermined angle (αe). As previously described, the second predetermined angle (αe) is larger than the first predetermined angle (αm).

The method may further comprise the electric coordination system 90 putting the second door operator 12 in a non-braking state when the understriking door leaf 2 is in a closed condition, and wherein the electric coordination system 90 is arranged to put the second door operator 12 in a non-braking state when the overstriking door leaf 3 is in a first opened state, which first opened state corresponds to a position of the overstriking door leaf 3 having an angle (α) in relation to a closed position of the overstriking door leaf 3 that is larger than the second predetermined angle (αe).

The method may further comprise switching to a service check mode of the electric coordination system 90 and to in said service check mode instructing the first motor 21 and the second motor 22 to drive the understriking door leaf 2 to its opened condition and the overstriking door leaf 2 to its first opened state, said first opened state corresponding to a position wherein the overstriking door leaf 3 has an angle (α) in relation to a closed position of the overstriking door leaf 3 that is larger than the first predetermined angle (αm), and in response to the understriking door leaf 2 and the overstriking door leaf 3 being in the in the opened condition and the first opened state, respectively, instructing the second motor 22 to drive the second door operator 12 to move the overstriking door leaf in a closing direction.

The method may further comprise to in the service check mode subsequently to instructing the second door operator 12 to move the overstriking door leaf 3 in a closing direction, in response to sensor data from the second sensing element 98 indicating that the overstriking door leaf 3 is stationary, obtaining the angle (α) of the overstriking door leaf 3 and comparing said angle (α) with the first predetermined angle (αm) and if the angle (α) of the overstriking door leaf 3 is outside a predetermined threshold around said first predetermined angle (αm) generating a service alarm.

The method may further comprise to in the service check mode subsequently to instructing the second door operator 12 to move the overstriking door leaf in a closing direction, in response to sensor data from the second sensing element 98 indicating that the overstriking door leaf 3 is stationary, instructing the first motor 21 to drive the first door operator 11 to move the understriking door leaf 2 in a closing direction.

The method may further comprise to in the service check mode subsequently to instructing the first motor 21 to drive the first door operator 11 to move the understriking door leaf 2 in the closing direction, in response to sensor data from the first sensing element 97 and the second sensing element 98 indicating that the overstriking door leaf 3 and the understriking door leaf 2 are stationary, obtaining the angle (α) of the overstriking door leaf 3 and the angle (β) of the understriking door leaf 2 and if said angle (α) is outside of a closed position interval associated with the closed position of said overstriking door leaf 3 and/or said angle (β) is outside of a closed position interval associated with the closed position of said understriking door leaf 2, generating a service alarm.

The invention has been described above in detail with reference to embodiments thereof. However, as is readily understood by those skilled in the art, other embodiments are equally possible within the scope of the present invention, as defined by the appended claims.

The invention claimed is:

1. A double door system comprising an understriking door leaf, an overstriking door leaf, a first door operator adapted to move the understriking door leaf between an open and a closed position, a second door operator adapted to move the overstriking door leaf between an open and a closed position, a mechanical brake arrangement and an electric coordination system, wherein the understriking door leaf is closed before the overstriking door leaf to close the double door, wherein the mechanical brake arrangement comprises a braking member arranged to brake the movement of the overstriking door leaf and a first controlling member which is mechanically operated, wherein the first controlling member is arranged to control the braking of the braking member in relation to the position of the understriking door leaf, wherein the second door operator comprises a second motor arranged to drive the overstriking door leaf between the opened and closed position, wherein the electric coordination system comprises an electric coordination controller operatively connected to the second motor, the electric coordination controller being configured to control the second motor to brake the movement of the overstriking door leaf based on the position of the understriking door leaf, the electric coordination system being electrically operated, wherein the first door operator comprises a first motor arranged to drive the understriking door leaf between the open and closed position and the electric coordination controller is operatively connected to the first motor to control the operation of said first motor, wherein the first controlling member and the second controlling member are arranged to put the braking member in a mechanical braking state when the understriking door leaf is in an opened condition and the overstriking door leaf is in a second opened state, which second opened state corresponds to a position of the overstriking door leaf having an angle (α) in relation to a closed position of the overstriking door leaf that is equal to or smaller than a first predetermined angle (αm), wherein the first controlling member is arranged to put the braking member in a non-braking state when the understriking door leaf is in a closed condition, and wherein the second controlling member is arranged to put the braking member in the non-braking state when the overstriking door leaf is in a first opened state, which first opened state corresponds to a position of the overstriking door leaf having an angle (α) in relation to a closed position of the overstriking door leaf that is larger than the first predetermined angle (αm), wherein the electric coordination system is configured to operate in a service check mode wherein the electric coordination controller is configured to instruct the first motor and the second motor to drive the understriking door leaf to the opened condition of the understriking door leaf and the overstriking door leaf to the first opened state of the overstriking door leaf, said first opened state of the overstriking door leaf corresponding to a position wherein the overstriking door leaf has an angle (α) in relation to the closed position of the overstriking door leaf that is larger than the first predetermined angle (αm), wherein the electric coordination controller in response to the understriking door leaf and the overstriking door leaf being in the opened condition of the understriking door leaf and the first opened state of the overstriking door leaf, respectively, is configured to instruct the second motor to drive the second door operator to move the overstriking door leaf in a closing direction.

2. The double door system according to claim 1, wherein the electric coordination controller subsequently to instructing the second door operator to move the overstriking door leaf in the closing direction, is configured to in response to sensor data from a second sensing element indicating that the overstriking door leaf is stationary, obtain the angle (α) of the overstriking door leaf and compare said angle (α) with the first predetermined angle (αm) and if the angle (α) of the overstriking door leaf is outside a predetermined threshold around said first predetermined angle (αm) generate a service alarm.

3. The double door system according to claim 1, wherein the electric coordination controller subsequently to instructing the second door operator to move the overstriking door leaf in the closing direction of the overstriking door leaf, is configured to in response to sensor data from a second sensing element indicating that the overstriking door leaf is stationary, instruct the first motor to drive the first door operator to move the understriking door leaf in a closing direction of the understriking door leaf.

4. The double door system according to claim 3, wherein the electric coordination controller subsequently to instructing the first motor to drive the first door operator to move the understriking door leaf in the closing direction of the understriking door leaf is configured to in response to sensor data from a first sensing element and the second sensing element indicating that the overstriking door leaf and the understriking door leaf are stationary, obtain the angle (α) of the overstriking door leaf and the angle (β) of the understriking door leaf and if said angle (α) of the overstriking door leaf is outside of a closed position interval associated with the closed position of said overstriking door leaf and/or said angle (β) is outside of a closed position interval associated with the closed position of said understriking door leaf, generate a service alarm.

5. A method for operating a double door system, the double door system comprising an understriking door leaf, an overstriking door leaf, a first door operator adapted to move the understriking door leaf between an open and a closed position, a second door operator adapted to move the overstriking door leaf between an open and a closed position, a mechanical brake arrangement and an electric coordination system, wherein the understriking door leaf is closed before the overstriking door leaf to close the double door, a second controlling member wherein the mechanical brake arrangement comprises a braking member arranged to brake the movement of the overstriking door leaf, a first controlling member which is mechanically operated, wherein the first controlling member is arranged to control the braking of the braking member in relation to the position of the understriking door leaf, and which is mechanically operated, wherein the second controlling member is arranged to control the braking of the braking member in relation to the position of the overstriking door leaf, wherein the second controlling member is arranged to put the braking member in a non-braking state when the overstriking door leaf is in a first opened state, which first opened state corresponds to a position of the overstriking door leaf having an angle (α) in relation to a closed position of the overstriking door leaf that is larger than the first predetermined angle (αm), wherein the second door operator comprises a second motor arranged to drive the overstriking door leaf between the opened and closed position of the overstriking door leaf, wherein the electric coordination system comprises an electric coordination controller operatively connected to the second motor, the electric coordination system being electrically operated, wherein the electric coordination controller is operatively connected to a first sensing element for monitoring an understriking door angle in relation to the closed position of the understriking door leaf and a second sensing element for monitoring an overstriking door angle in relation to the closed position of the overstriking door leaf, wherein the first door operator comprises a first motor arranged to drive the understriking door leaf between the opened and closed position of the understriking door leaf, wherein the electric coordination controller is operatively connected to the first motor to control the operation of said first motor the method comprising:

controlling the second motor to brake the movement of the overstriking door leaf based on the position of the understriking door leaf;

putting the braking member in a mechanical braking state by the first controlling member and the second controlling member when the understriking door leaf is in an opened condition and the overstriking door leaf is in a second opened state, which second opened state corresponds to a position of the overstriking door leaf having an angle (α) in relation to a closed position of the overstriking door leaf that is equal to or smaller than a first predetermined angle (αm)

putting the braking member in a non-braking state by the first controlling member when the understriking door leaf is in a closed condition, switching to a service check mode of the electric coordination system and to in said service check mode:

instructing the first motor and the second motor to drive the understriking door leaf to its opened condition and the overstriking door leaf to its first opened state, said first opened state corresponding to a position wherein the overstriking door leaf has an angle (α) in relation to a closed position of the overstriking door leaf that is larger than the first predetermined angle (αm), and in response to the understriking door leaf and the overstriking door leaf being in the opened condition and the first opened state, respectively, instructing the second motor to drive the second door operator to move the overstriking door leaf in a closing direction.

6. The method according to claim 5, further comprising to, in the service check mode:

subsequently to instructing the second door operator to move the overstriking door leaf in the closing direction, in response to sensor data from the second sensing element indicating that the overstriking door leaf is stationary, obtaining the angle (α) of the overstriking door leaf and comparing said angle (α) with the first predetermined angle (αm) and if the angle (α) of the overstriking door leaf is outside a predetermined threshold around said first predetermined angle (αm) generating a service alarm.

7. The method according to claim 5, further comprising to, in the service check mode:

subsequently to instructing the second door operator to move the overstriking door leaf in the closing direction, in response to sensor data from the second sensing element indicating that the overstriking door leaf is stationary, instructing the first motor to drive the first door operator to move the understriking door leaf in a closing direction of the understriking door leaf.

8. The method according to claim 7, further comprising to, in the service check mode:

subsequently to instructing the first motor to drive the first door operator to move the understriking door leaf in the closing direction, in response to sensor data from the first sensing element and the second sensing element indicating that the overstriking door leaf and the understriking door leaf are stationary, obtaining the angle (α) of the overstriking door leaf and the angle (β) of the understriking door leaf and if said angle (α) is outside of a closed position interval associated with the closed position of said overstriking door leaf and/or said angle (β) is outside of a closed position interval associated with the closed position of said understriking door leaf, generating a service alarm.

* * * * *